United States Patent
Ayash et al.

(10) Patent No.: US 8,767,259 B2
(45) Date of Patent: Jul. 1, 2014

(54) IMAGE QUALITY STATUS WORKFLOW

(75) Inventors: Barry Ayash, Webster, NY (US); Joseph Harrison, Ontario, NY (US); Jack Hirsh, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 121 days.

(21) Appl. No.: 13/220,019

(22) Filed: Aug. 29, 2011

(65) Prior Publication Data

US 2013/0050720 A1 Feb. 28, 2013

(51) Int. Cl.
G08B 21/00 (2006.01)
H04N 1/60 (2006.01)

(52) U.S. Cl.
USPC .......................................................... 358/1.9

(58) Field of Classification Search
USPC ........................................ 358/1.9, 1.18, 1.16
See application file for complete search history.

(56) References Cited

U.S. PATENT DOCUMENTS

| | | | |
|---|---|---|---|
| 6,543,873 B1 * | 4/2003 | Van Veen | 347/19 |
| 8,189,229 B2 * | 5/2012 | Mori | 358/1.18 |
| 2005/0151981 A1 | 7/2005 | Levine et al. | |

* cited by examiner

*Primary Examiner* — Mark Zimmerman
*Assistant Examiner* — Marchelle L Taggart
(74) *Attorney, Agent, or Firm* — Fay Sharpe LLP

(57) ABSTRACT

Methods and systems for maintaining image quality are disclosed. A printing system and method is provided for maintaining image quality, comprising: initially establishing a plurality of image quality threshold standards; assigning an image quality threshold standard from the plurality of image quality threshold standards to an associated image job; comparing the assigned image quality threshold standard of each associated image job to a system check value; and, marking any image jobs having an assigned image quality threshold standard greater than the quality system check value.

10 Claims, 2 Drawing Sheets

IMAGE QUALITY STATUS WORKFLOW

BACKGROUND

In a xerographic printing system, due to machine drift during long job runs or other system alterations, the system attributes may shift. This attribute shift may result in less than acceptable image quality, even though image quality was satisfactory at the beginning of the job run or for a previous job run. The present disclosure provides a status indicator in a queue, for example on the Digital Front End (DFE), to alert an operator if part of the run or the complete run, should be checked visually or through other means, for acceptable output. This disclosure is directed to a method and system for monitoring a workflow to flag unacceptable output.

SUMMARY

A printing system and method is provided for maintaining image quality, comprising: initially establishing a plurality of image quality threshold standards; assigning an image quality threshold standard from the plurality of image quality threshold standards to an associated image job; comparing the assigned image quality threshold standard of each associated image job to a system check value; and, alerting an operator to a status of the comparing the assigned image quality threshold standard of each associated image job to the system check value.

The present disclosure further provides for a system and a method for maintaining image quality, comprising: initially establishing a plurality of image quality threshold standards; assigning an image quality threshold standard from the plurality of image quality threshold standards to an associated image job; comparing the assigned image quality threshold standard of each associated image job to a system check value; marking any image jobs having an assigned image quality threshold standard greater than the quality system check value; and, recording the system check value as a completed job attribute.

Further in accordance with the present disclosure, a method is provided for maintaining image quality, comprising: initially establishing a plurality of image quality threshold standards; assigning an image quality threshold standard from the plurality of image quality threshold standards to an associated image job; comparing the assigned image quality threshold standard of each associated image job to a system check value; and, marking any image jobs having an assigned image quality threshold standard greater than the quality system check value. The marking reflects a gradient representing how far the system check value is away from the assigned image quality threshold standard.

BRIEF DESCRIPTION OF THE DRAWINGS

The following is a brief description of the drawing used to illustrate the present disclosure, and thus, is being presented for illustrative purposes only and should not be limitative of the scope of the present disclosure, wherein.

DETAILED DESCRIPTION

In many areas of copier/printer/scanner image quality, it is desirable to establish and maintain a certain quality of output. In this manner, the workflow can be monitored and maintained at predetermined image quality levels. The workflow can include, and also ensure, that image jobs with a specified or assigned image quality threshold standard have their respective output, via a system check value, compared to that standard. The comparison can be 'marked' or recorded onto the output, or displayed, such as to alert the operator to the status of the output. The alert can provide information that alerts the operator if part, or the complete job output, should be checked visually, or through other means, for acceptable output. This in turn would ensure that the jobs printed would be marked at least when the actual quality through the system check value falls below the assigned image quality threshold standard.

One embodiment of the method for ensuring image quality status workflow and the image quality output is as follows. At a queue level, there can be a selection, i.e. a system check, and a corresponding system check value (SCV). If the system check is selected, then jobs would be monitored to determine if the actual output or SCV quality is above, at, or below the established or assigned image quality threshold standard. Once the SCV falls below the assigned image quality threshold standard, the system can begin marking or flagging output, recording jobs, and/or alerting an operator to the fact that the present job or previous job (partially or entirely) does or did not meet the assigned quality standard, respectively.

The aforementioned flagging of jobs would be created for assessing the image quality of the jobs. The aforementioned method would increase customer satisfaction by increasing the confidence of the operator with the quality of the output. This would also improve production results by reducing the number of jobs that are potentially reviewed by an operator for quality reasons. Printing when the quality range (SVC) is outside the specified range alerts and enables the operator to review those respective print jobs and make determinations on their acceptability.

Figure 1A:
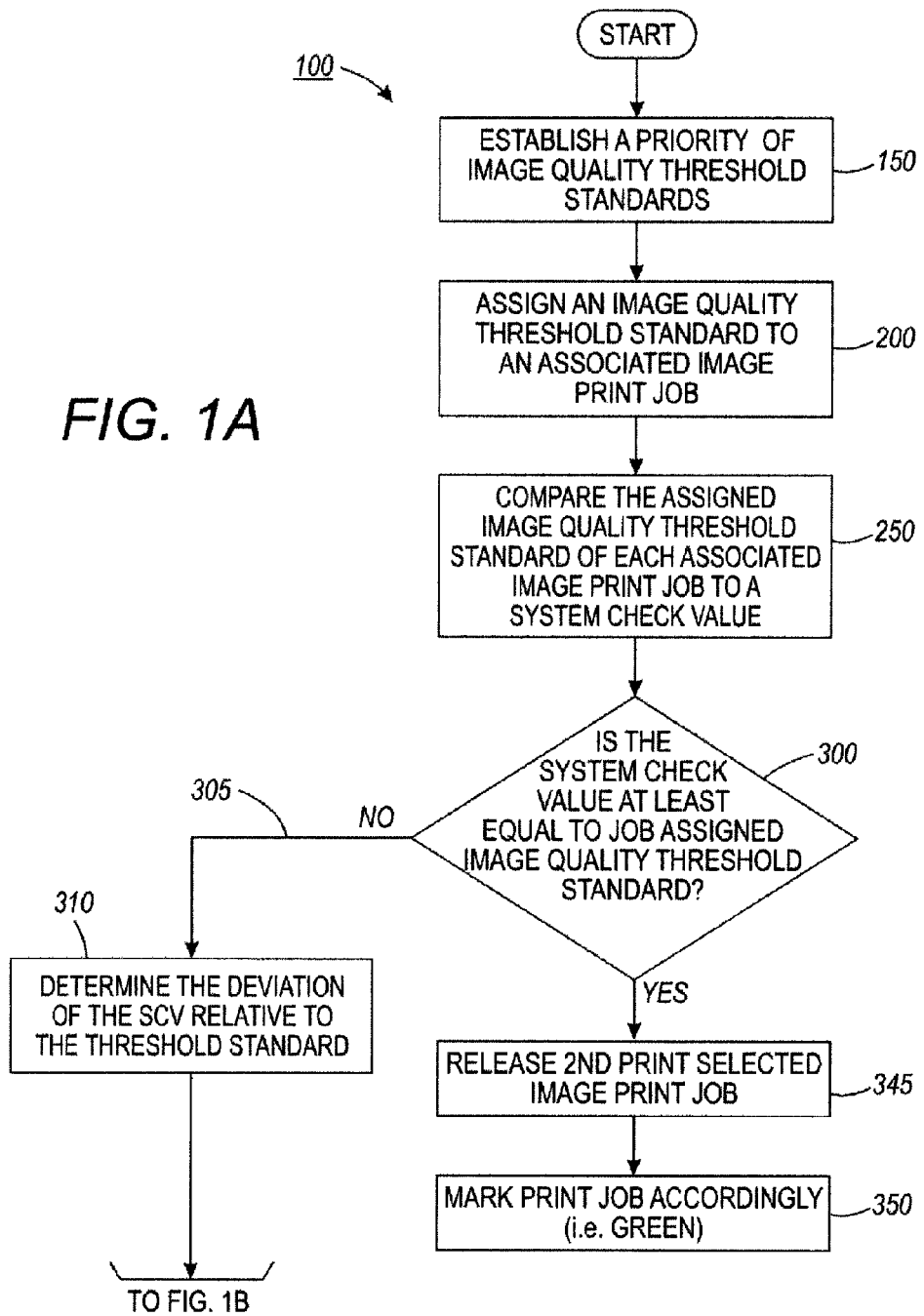
FIGS. 1A-1B show a flowchart illustrating a workflow for maintaining, flagging, alerting, and/or marking image quality output unacceptable relative to an image quality threshold.
Figure 1B:
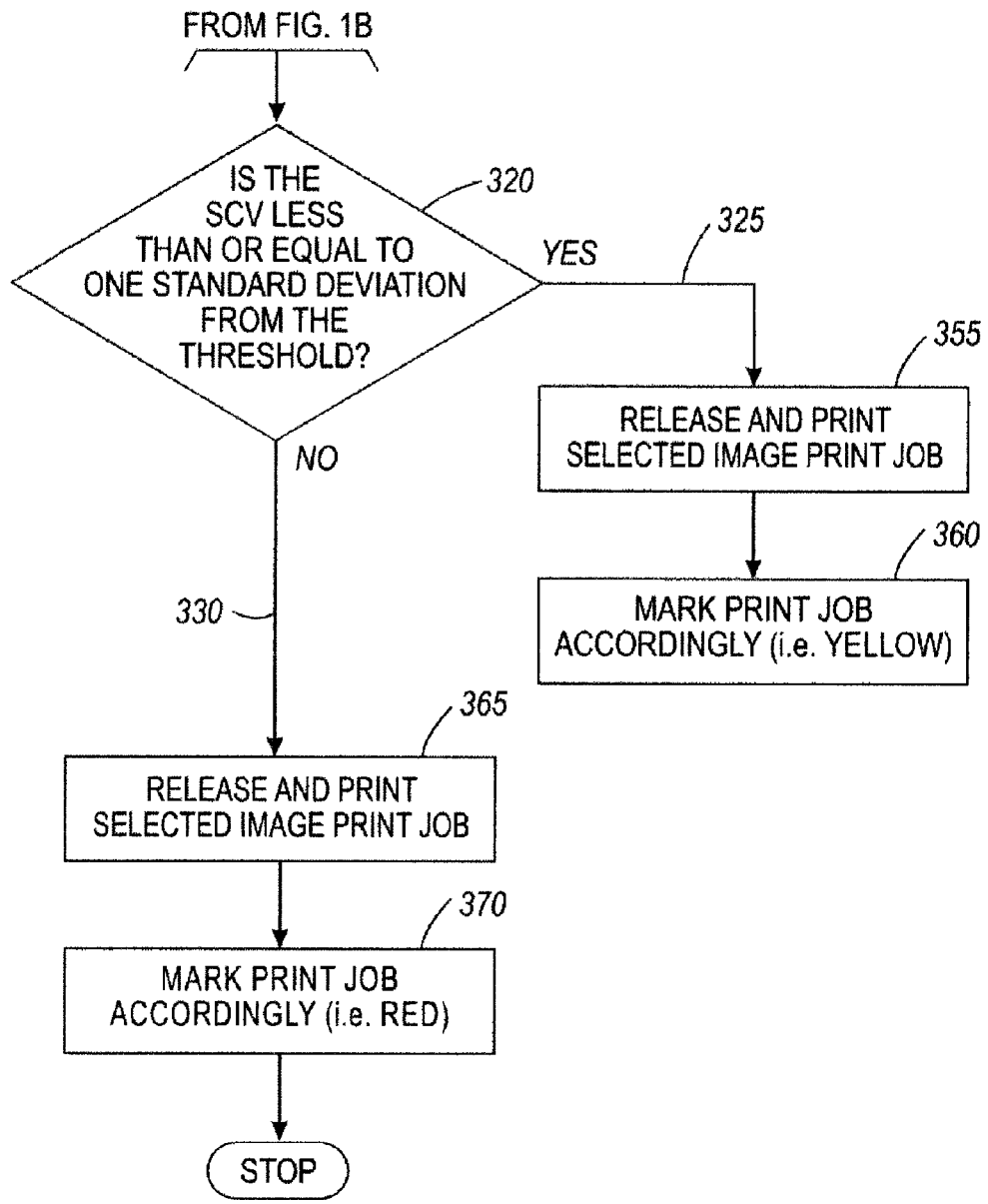

Referring to FIGS. 1A-1B, the present disclosure concerns and affects the status of image jobs to be printed on a system that may not be printing or outputting in a manner that meets an assigned or predeterminable standard. The disclosure seeks to take advantage of a printer's inline image quality measurement system, for example, a color maintenance tool on an iGen system. The described workflow would provide for a job queue that would mark jobs if the system image quality did not meet an operator specified threshold (predetermined quality threshold). This in turn would ensure that print jobs will be highlighted and/or marked if the actual image quality is not at the specified acceptable image quality level set by the operator.

Another aspect of the disclosure enables queues to be established with system image quality thresholds as a queue attribute. The benefit it provides is a mechanism for customers with jobs having varying image quality expectations to control the image quality of the output. One of the results of the aforementioned method is that it allows a simple mechanism to monitor, mark, and/or alert operators and customers whether or not the actual print job was within the predeterminable established threshold or standard.

Referring again to FIGS. 1A-1B, in one exemplary arrangement, the present disclosure provides a method for monitoring and marking image quality 100. The method comprises initially establishing a plurality of image quality threshold standards for a print job 150. The method then assigns an image quality threshold standard from the plurality of image quality threshold standards to an associated image print job 200. The method compares the assigned image quality threshold standard of each associated image job to a quality system check value 250; and, releases and prints the selected image jobs 345 if the quality system check value is at least equal to the assigned image quality threshold standard 300.

Another aspect provided and claimed in the present disclosure is to mark the respective output having a quality below the threshold, wherein the marking involves gradient information. For example, the gradient can represent how far away (i.e. deviation) the measured SCV value is relative to the standard 310, 320. As the actual SCV drifts away from the standard, the marking would reflect the difference and indicate a gradient level, or amount of drift, that becomes associated with the respective output. In one exemplary arrangement, the system can alert the operator as the measured value SCV moves 320 from meeting the standard (i.e. green) 345, 350, to slightly less than the standard (i.e. yellow) 355, 360, and then to significantly less than the standard (i.e. red) 365, 370. The variation from the standard can be measured 310, 320 and associated with each respective color. For example, less than or equal to one standard deviation from the threshold 325 can be associated with yellow 355, 360. Greater than one standard deviation from the threshold 330 can be associated with red 365, 370. The above described variations and markings are for illustrative purposes. It is to be appreciated that any predeterminable variation gradients can be selected along with respective markings.

The system can continue to monitor and mark, in some form, any image jobs having an assigned image quality threshold standard greater than the quality system check value 300, 305. The system can also mark any image jobs 360, 370 having an assigned image quality threshold standard greater than the quality system check value 305. It is to be appreciated that the quality system check value can be an inline image quality measurement. And the inline image quality measurement can be a color maintenance tool (CMT). In addition, the established plurality of image quality threshold standards can be predeterminable by an operator.

In another exemplary arrangement, the present disclosure provides a method for monitoring and highlighting for an operator, the image quality including initially establishing a plurality of image quality threshold standards; and, assigning an image quality threshold standard from the plurality of image quality threshold standards to an associated image job. The method compares the assigned image quality threshold standard of each associated image critical job to a system check value, and marks any image jobs having an assigned image quality threshold standard greater than the quality system check value. The method further records the system check value as a completed job attribute.

In still a further exemplary arrangement, the present disclosure provides a method for monitoring and highlighting for an operator, the image quality including initially establishing a plurality of image quality threshold standards; and, assigning an image quality threshold standard from the plurality of image quality threshold standards to an associated image job. The method compares the assigned image quality threshold standard of each associated image critical job to a system check value, and marks any image jobs having an assigned image quality threshold standard greater than the quality system check value. The marking can reflect a gradient representing how far the system check value is away from the assigned image quality threshold standard.

In one embodiment, the inline image quality measurement can be a color maintenance tool (CMT). The CMT can be initiated as a function of time or via 'x' number of prints, i.e. time dependent variable or volume dependent variable, respectively. For example, the system check could be initiated every thousand sheets, ten thousand sheets, every six hours, etc. Then once the system is running and processing jobs, at the predetermined initiation of the dependent variable or 'trigger', the system can run the CMT. If the CMT value drops below the established threshold for the queue, the job can be marked according to the variation between the assigned image quality threshold standard and the quality system check value.

Based on the methods and systems described above, the operator can select a 'system check' mode and a corresponding system check value. The method described improves performance of printing products and customer satisfaction of said same printing products. From an operator standpoint, the system check eliminates or decreases the number of print jobs that do not meet customer expectations.

While the disclosure has been described in conjunction with the specific embodiments described above, it is evident that many alternatives, modifications and variations are apparent to those skilled in the art. Accordingly, the preferred embodiments of the disclosure as set forth above are intended to be illustrative and not limiting. Various changes can be made without departing from the spirit and scope of the disclosure.

The invention claimed is:

1. A method, comprising:
   initially establishing a plurality of image quality threshold standards;
   predetermining and assigning an image quality threshold standard from the plurality of image quality threshold standards to an associated image job;
   comparing the assigned image quality threshold standard of each associated image job to a quality system check value;
   wherein the quality system check value is an inline image quality measurement;
   alerting an operator to a status of the comparing the assigned image quality threshold standard of each associated image job to the quality system check value;
   wherein the status includes a first print marking if the quality system check value is greater than or equal to the assigned image quality threshold standard;
   wherein the status includes at least a second print marking if the quality system check value is less than the assigned image quality threshold standard and greater than or equal to a predetermined deviation from the assigned image quality threshold standard;
   wherein the status includes a third print marking if the quality system check value is less than the predetermined deviation from the assigned image quality threshold standard; and,
   wherein the predetermined deviation is one standard deviation from the assigned image quality threshold standard.

2. The method of claim 1, further comprising;
   grading any image jobs having an assigned image quality threshold standard greater than the quality system check value and then releasing the held image jobs once the quality system check value is at least equal to the assigned image quality threshold standard of the held image job.

3. The method of claim 1, wherein the inline image quality measurement is a color maintenance tool.

4. A method, comprising:
   initially establishing a plurality of image quality threshold standards;
   assigning an image quality threshold standard from the plurality of image quality threshold standards to an associated image job;

comparing the assigned image quality threshold standard of each associated image job to a quality system check value;

wherein the quality system check value is an inline image quality measurement;

marking any image jobs having an assigned image quality threshold standard greater than the quality system check value;

recording the quality system check value as a completed job attribute;

wherein the marking includes a first print marking if the quality system check value is greater than or equal to the assigned image quality threshold standard;

wherein the marking includes at least a second print marking if the quality system check value is less than the assigned image quality threshold standard and greater than or equal to a predetermined deviation; and, wherein the predetermined deviation is one standard deviation from the assigned image quality threshold standard.

5. The method of claim 4 further comprising;
releasing and printing selected image jobs if the quality system check value is at least equal to the assigned image quality threshold standard.

6. The method of claim 4, wherein the inline image quality measurement is a color maintenance tool.

7. A method, comprising:
initially establishing a plurality of image quality threshold standards;
predetermining and assigning an image quality threshold standard from the plurality of image quality threshold standards to an associated image job;
comparing the assigned image quality threshold standard of each associated image job to a quality system check value;
wherein the quality system check value is an inline image quality measurement;
marking any image jobs having an assigned image quality threshold standard greater than the quality system check value;
wherein the marking reflects a gradient representing how far the quality system check value is away from the assigned image quality threshold standard;
wherein the marking includes a first print marking if the quality system check value is greater than or equal to the assigned image quality threshold standard;
wherein the marking includes at least a second print marking if the quality system check value is less than the assigned image quality threshold standard and greater than or equal to a predetermined deviation; and,
wherein the marking includes a third print marking if the quality system check value is less than the predetermined deviation from the assigned image quality threshold standard.

8. The method of claim 7, wherein the inline image quality measurement is a color maintenance tool.

9. The method of claim 4, wherein the marking includes a third print marking if the quality system check value is less than the predetermined deviation from the assigned image quality threshold standard.

10. The method of claim 7, wherein the predetermined deviation is one standard deviation from the assigned image quality threshold standard.

* * * * *